United States Patent [19]

Hattori et al.

[11] Patent Number: 4,947,452
[45] Date of Patent: Aug. 7, 1990

[54] MOBILE COMMUNICATION SYSTEM

[75] Inventors: Seiji Hattori; Akihide Kasukawa, both of Tokyo; Yoshizo Shibano, Osaka; Yoshinobu Kobayashi, Osaka; Shinji Suzuki, Osaka, all of Japan

[73] Assignees: The Tokyo Electric Power Company, Ltd., Tokyo; Sumitomo Electric Industries, Ltd., Osaka, both of Japan

[21] Appl. No.: 295,817

[22] Filed: Jan. 11, 1989

[30] Foreign Application Priority Data

Jan. 14, 1988 [JP] Japan .................................. 63-6556

[51] Int. Cl.$^5$ .......................... H04A 7/00; H04B 1/00
[52] U.S. Cl. ...................................... 455/33; 455/54; 379/60
[58] Field of Search ................. 455/33, 34, 54, 56, 455/88, 277–280; 379/58–60, 63; 370/56, 69, 93

[56] References Cited

U.S. PATENT DOCUMENTS 4,723,266 2/1988 Perry ........................................ 455/33
4,765,753 8/1988 Schmidt ................................. 370/60

Primary Examiner—Reinhard J. Eisenzopf
Assistant Examiner—Curtis A. Kuntz
Attorney, Agent, or Firm—Cushman, Darby & Cushman

[57] ABSTRACT

A mobile communication system is provided wherein a plurality of signposts enable communications among mobile stations and a switching system in a predetermined communicating area, and are connected through a transmission network connected to a fixed network according to the invention, each of the signposts has dual zone communications ability including a communicating area which overlaps the communicating areas or adjacent signposts, and a zone switching signal area which does not overlap the zone switching signal areas of adjacent signposts. The signpost and mobile stations, jointly detect on-going signal levels of the mobile station, and communication area switching operation are carried out as needed. In the mobile communication system of the invention, a transmitting and receiving equipment can be a single transceiver which switches over the frequencies to communicating channel frequencies and to zone switching controlling frequencies.

10 Claims, 6 Drawing Sheets

COMMUNICATING ANTENNA

ZONE SWITCHING ANTENNA

MOBILE COMMUNICATION SYSTEM

FIELD OF THE INVENTION

This invention relates to a zone type mobile communication system, and more particularly to a mobile communication system wherein a plurality of signposts for relaying communications among mobile stations and a switching system in a predetermined communicating zone are disposed in a road traffic network. The communication system of the present invention is capable of interconnection with a fixed communication network.

BACKGROUND OF THE INVENTION

Heretofore, a zone type mobile communication system included a zone switching operation that provided communications for the ordinary automobile telephone system by utilizing a plurality of mobile radio base stations to detect the received levels of radio waves transmitted by the mobile stations. A mobile control station, according to the received levels transmitted by the mobile radio base stations, selects the mobile radio base station of which the received level is highest.

This will be described in more detail. A given mobile radio base station monitors the received level of radio waves transmitted by a predetermined mobile station, and when the received signal level becomes lower than a predetermined value, assumes that the mobile station of interest has entered another zone; the base station then transmits a level deterioration signal to the mobile control station. Upon reception of the level deterioration signal, the mobile control station commands the remaining mobile radio base stations to monitor the signal levels of the mobile station of interest. The mobile control station compares the signal level of the mobile station as reported by each of the mobile radio base stations and selects the base station reporting the highest received signal level from the mobile station of interest. The mobile control station then assigns a new channel between the mobile base station so selected and the automobile switching center, and instructs the previous mobile radio base station to disconnect its channel.

PROBLEMS TO BE SOLVED BY THE INVENTION

In the above-described system, zone switching is carried out by the mobile radio base station and the mobile control station, which are network facilities. Applying this conventional system architecture to a mobile communication system utilizing numerous signposts therefore causes following disadvantages: because of the use of the number of signposts, control operations such as detecting the position of a mobile station and switching the communicating zones become complicated and take a relatively long time to accomplish.

In view of the foregoing, an object of this invention is to provide a mobile communication system wherein zone switching operations are achieved quickly by a signpost and a mobile station.

The foregoing object of the invention is achieved by the provision of a mobile communication system wherein a plurality of signposts communicate between a mobile station and a switching system in a predetermined communicating area and are connected through a transmission system connected to a public switched communication network. According to the invention, each of the signposts has dual zone communications ability because their voice communication area overlaps the communicating areas of adjacent signposts. The zone switching signal area of each signpost does not overlap the zone switching signal areas of adjacent signposts. The signpost and mobile station, jointly detect the on-going position of the mobile station, and communication area switching operations are carried out as needed. The object of the invention, may also achieved by operating a single transceiver which switches over the frequencies to communicating channel frequencies and to zone switching controlling frequencies.

SUMMARY OF THE INVENTION

In the mobile communication system of the invention, each signpost has dual zone capabilities. The first of these zones is a communication area. The communication area of each signpost overlaps the communicating area of adjacent signposts. A zone switching signal area is also included which does not overlap the zone switching signal areas of adjacent signposts. Therefore, a mobile station which traverses zone switching signal areas of signposts, upon reception of a zone switching signal, detects the zone in which it is presently located from the signal levels therein. By switching the communicating channel of the previous signpost over to that of the signpost in the zone thus detected, the mobile station receives signals with a correspondingly higher signal strength level.

This will be described in more detail. The antenna of each signpost, as shown in FIG. 1, includes two types of directional antennas: a communicating antenna, and a zone switching antenna for transmitting a zone switching signal radio wave (one antenna can physically radiate two different radio waves when excited utilizing different techniques.) The directivity of the communicating antenna is such that it provides a propagation path coincident with a road. This propagation path overlaps the path of adjacent signposts. The zone switching antenna is highly directive and is meant only to be able to communicate along the transmission path of interest of a particular signpost (see FIG. 2). This propagation path does not overlap the path of adjacent signposts.

As was described above, two areas, a communicating area and a zone switching area, are provided. Therefore, when a mobile station is at a position where two communication areas overlap, the mobile station receives a transmission signal by using the communication channel of the preceding (old) signpost. When the mobile station exits the area of communication overlap and enters the exclusive zone switching signal area of another (new) signpost, it receives the zone switching signal radio waves therefrom, and as a result, can detect its present position from the signal levels thereof.

For the purpose of detecting the position of a mobile station, it is preferable that the zone switching antenna be highly directional; however, the directivity is designed so that reliability does not suffer. Signal transmitting and receiving channels, which are switchable at high speed from communicating channel frequencies to zone switching controlling frequencies are therefore provided in one unit at the mobile station.

DETAILED DESCRIPTION OF THE PREFERRED EMBODIMENT

One preferred embodiment of this invention will be described with reference to the accompanying drawings.

Figure 1:
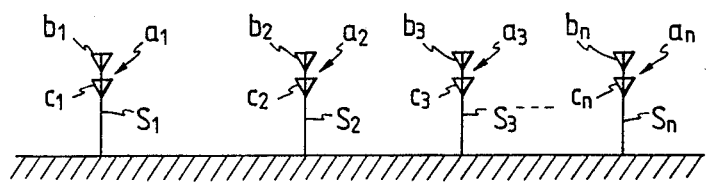
FIG. 1 is an explanatory diagram showing an arrangement of signpost antennas.

FIG. 1 is an explanatory diagram showing an arrangement of signpost antennas a1, a2, . . . in a mobile communication system according to the present invention. The signpost antennas a1, a2, . . . and an include communicating antennas b1, b2, . . . bn, and zone switching antennas c1, c2, . . . cn, for transmitting zone switching signals.

Figure 2:
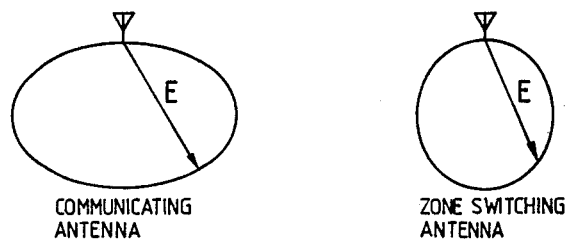
FIG. 2 is an explanatory diagram showing the directivities in a vertical plane of a communicating antenna and a zone switching antenna which together form a signpost antenna.

FIG. 2 shows the directivities in a vertical plane of the communicating antennas and the zone switching antennas. Each directivity of the communicating antennas b1, b2, . . . bn is appropriately extended along the road. Each directivity of the zone switching antennas c1, c2, . . . and cn is suppressed both in horizontal direction and in upward direction, but extends in a downward direction towards the road of interest.

Figure 3:
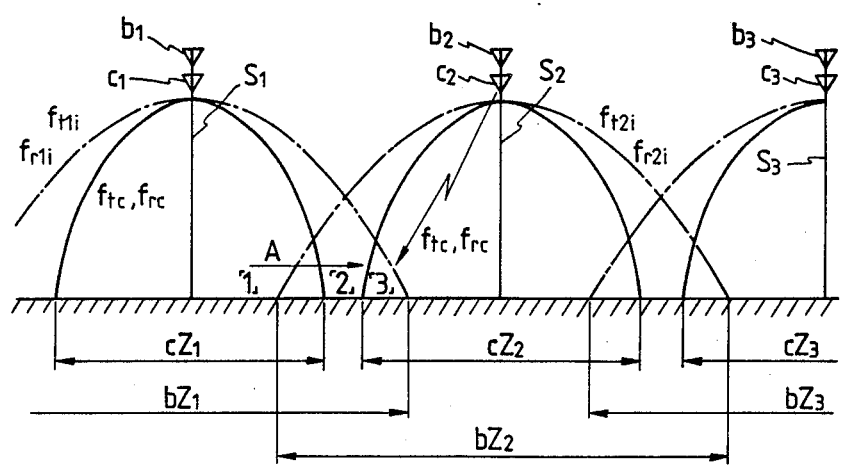
FIG. 3 is an explanatory diagram showing propagation areas covered by the communicating antenna and the zone switching antenna.

FIG. 3 shows propagation areas covered by the communication antennas and the zone switching antennas. The communication antennas b1, b2 and b3 include communication areas bZ1, bZ2 and bZ3, respectively. The communication antennas are disposed in such a manner that the communication areas overlap; that is, communication area bZ1 overlaps the communication area bZ2, and the communication area bZ2 overlaps the communication region bZ3. Assume that signpost S1 is presently relaying communications with a mobile station 1, traveling in the direction of the arrow A, by using a transmitting frequency ft1 and a receiving frequency fr1 assigned to the signpost S1.

The zone switching antennas c1, c2 and c3 have zone switching signal areas cZ1, cZ2 and cZ3, respectively, which are separated from one another (not overlapping), and they transmit zone switching signals towards the road using the frequency ftc which is assigned to all of the signposts. Various control signals (for instance, for paging the mobile stations) and signals representing the numbers of repeaters transmitting those particular control signals are carried by the frequency ftc. In addition, empty channels not used by the signpost may carry data.

Figure 4:
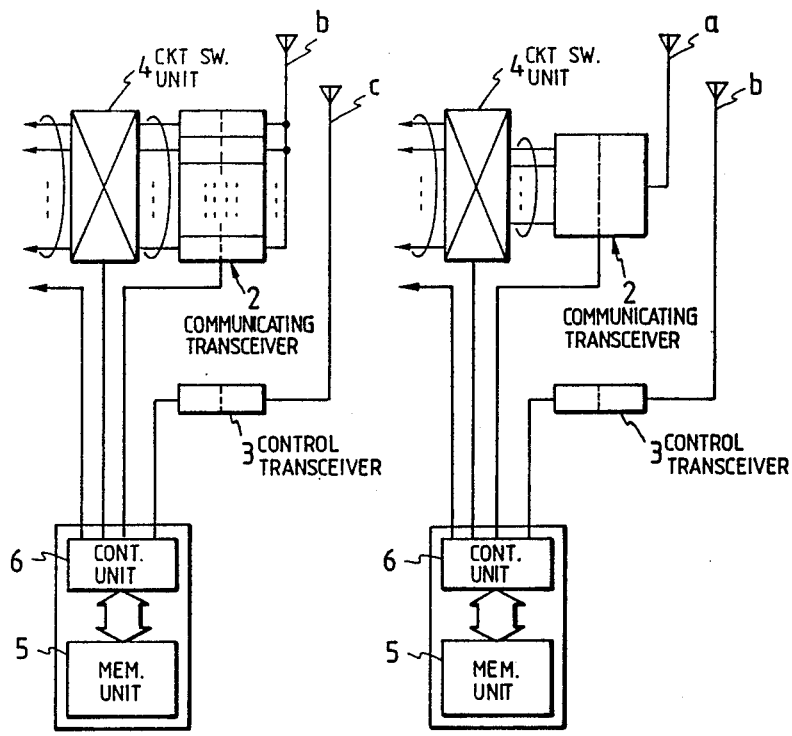
FIG. 4 is a block diagram showing one example of the arrangement of a signpost according to a FDMA system.

FIG. 4 is a block diagram showing one example of the arrangement of a signpost (S). The signpost includes: communicating transceivers 2; a controlling transceiver 3 for controlling a zone switching operation, or terminating or originating a call (described later); a circuit switching unit 4 for selectively connecting the communicating transceivers to a network; a communicating antenna b; a zone switching antenna c; a memory unit 5 for storage, utilized for instance by a wireless channel and mobile station ID control table; and a control unit 6.

The communicating transceivers 2 include as many channels as are required, and are connected to predetermined channel circuits and networks by means of the circuit switching unit 4. Assignment of a frequency, i.e., assignment of a wireless channel to the mobile station 1, and connection to a network are carried out as functions of the signpost S itself, under the control of the control unit 6 according to a "wire and wireless channel assignment control table" stored in the memory unit 5.

The controlling transceiver 3 is connected to the zone switching antenna c, so that various data signals necessary for switching zones and control signals for the operation of call terminating or originating are transmitted between the controlling transceiver 3 and the mobile station 1.

Figure 5:
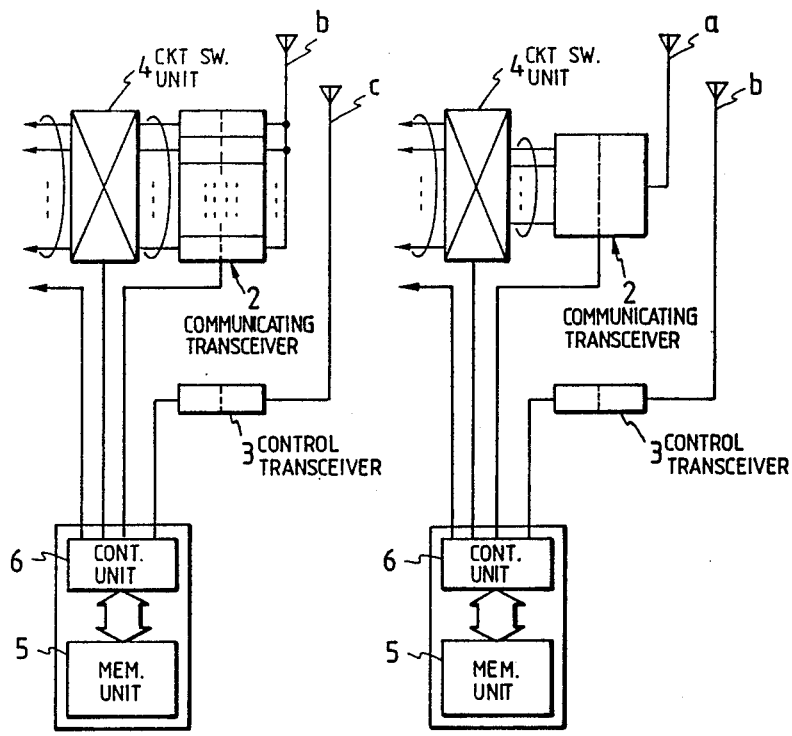
FIG. 5 is a block diagram showing one example of the arrangement of a signpost according to a TDMA system.

FIG. 5 is a block diagram showing the arrangement of a signpost according to a TDMA system. The signpost of FIG. 5 is different from that of FIG. 4 only in that instead of the wireless channels, time slots are employed.

In both a FDMA signpost and the TDMA signpost the communication channel frequency is not the same as the control signal frequency. For the purpose of eliminating signal interference, different communication channel frequencies are assigned to different signposts; however, a single zone switching radio wave frequency is assigned to all of the signposts because the zone switching areas do not overlap.

Figure 6:
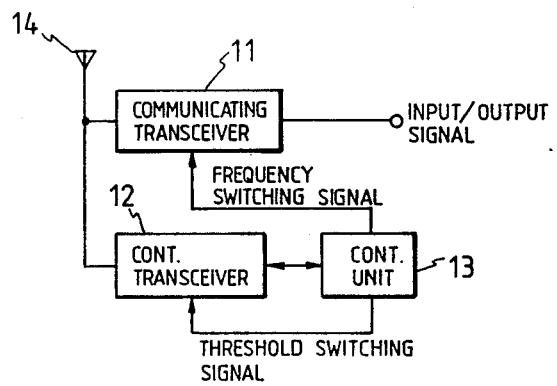
FIG. 6 is a block diagram showing one example of the configuration of a mobile station.

FIG. 6 is a block diagram showing one example of the configuration of the mobile station 1. The mobile station 1, as shown in FIG. 6, includes: a communicating transceiver 11 for converting an input signal transmitted through the communicating antenna b into an audio signal, and for converting an audio signal into a modulated radio signal; a controlling transceiver 12 having a low threshold value for receiving a paging signal from a signpost at all times, and a zone switching threshold value (see FIG. 9) to monitoring the controlling radio waves; a control unit 13 for switching the two threshold values and for switching the frequencies of the communicating transceiver 11; and an antenna 14. The controlling transceiver 12 monitors the controlling radio waves at all times, and according to the control signals extracted from the controlling radio waves, detects the levels of signals received from various zones, identifies the optimal signpost, and transmits control signals for the operation of a call termination or origination.

Figure 7:
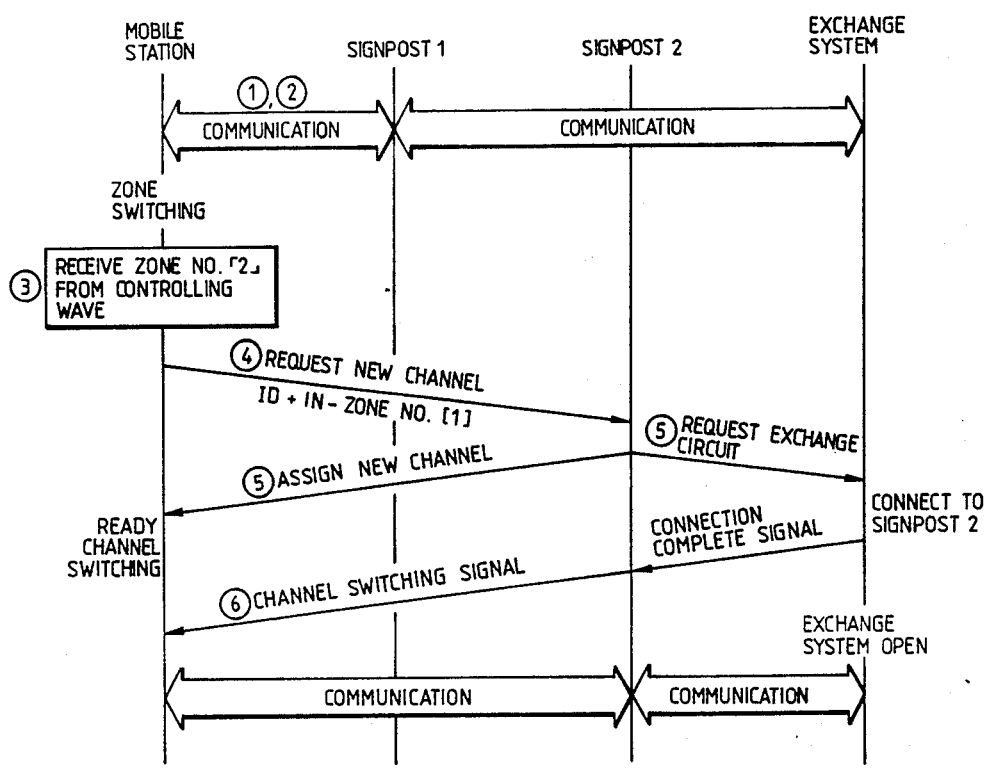
FIG. 7 is an explanatory diagram showing a communicating channel switching procedure.

Signal transmission between the mobile station 1, the signpost S, and an exchange system will now be described with particular reference to an FDMA system. FIG. 7 shows a communicating channel switching procedure. At the point "1" in the communicating region 1 (FIG. 3), the mobile station 1 is transmitting to the communicating antenna of the sign post S1 via frequencies ft1 and fr1. Concurrently, the mobile station 1 receives the zone switching radio wave ftc via the controlling transceiver. Recognizing from the signpost number included in the zone switching radio wave ftc that the mobile station is in zone 1 (hereinafter, the zone in which the mobile station is located will be referred to as an "in-zone", when applicable).

When the mobile station 1 reaches the point "2" from the point "1" the received signal level becomes lower than the predetermined threshold value, and it is determined that the mobile station is now out of the zone switching signal area cZ1. However, the inzone 1 information has been stored by the mobile station, and since the mobile station is still in the communicating area bZ1, communication with the signpost S1 is maintained.

When the mobile station 1 reaches the point "3"; that is, it travels into the zone switching signal area cZ2, the signpost number "2" is transmitted with the zone switching radio wave, and therefore it determines that the mobile station 1 has entered the next zone; that is, its new in-zone number is "2".

In order to obtain the communicating frequency of the communication area bZ2, the mobile station 1 queries the signpost S2 for a new frequency by using the zone switching signal radio wave up-link (the term "up" as used herein is intended to represent hailing from a mobile station), and transmits a signal representing the previous in-zone number "1" to the signpost S2.

The signpost S2 transmits the communicating frequency assigned thereto to the mobile station by using the zone switching radio wave down-link ftc (the term "down" as used herein is intended to represent a hailing for a mobile station), and transmits the previous in-zone number "1" and the mobile station ID to the exchange system, requesting an exchange of the communication circuits.

After the link between the exchange system and the signposts is achieved, the communicating frequencies are then switched over to the frequencies ft2i and fr2i of the signpost S2. Thereafter, the preceding signpost S1 is informed that communication with it has ended; the communication channels with the frequencies ftli and frli are reset, and the wireless circuit to the signpost S1 from the exchange system is opened. Upon switching of the communication, the in-zone number of the mobile station 1 is changed from "1" to "2". The switching period of communications is minimized.

In cases where the signpost S2 transmits informations about empty channels using the down-link ftc, the mobile station may select one of the empty channels and report it to the signpost S2 so that the signpost S2 can enable communications using the empty channel thus reported. The signpost then instructs the mobile station to switch the communication channel.

As is apparent from the above description, the zone switching operation is primarily accomplished be the mobile station. In addition, the mobile station can detect its present position by detecting the current in-zone number, while the signpost detects the position of the mobile station from the ID of the mobile station 1. Where the communication channels are of the TDMA type, the zone switching operation is substantially similar to the case where the communicating channels are of the FDMA system, but time slots are employed instead of frequency domains.

Figure 8:
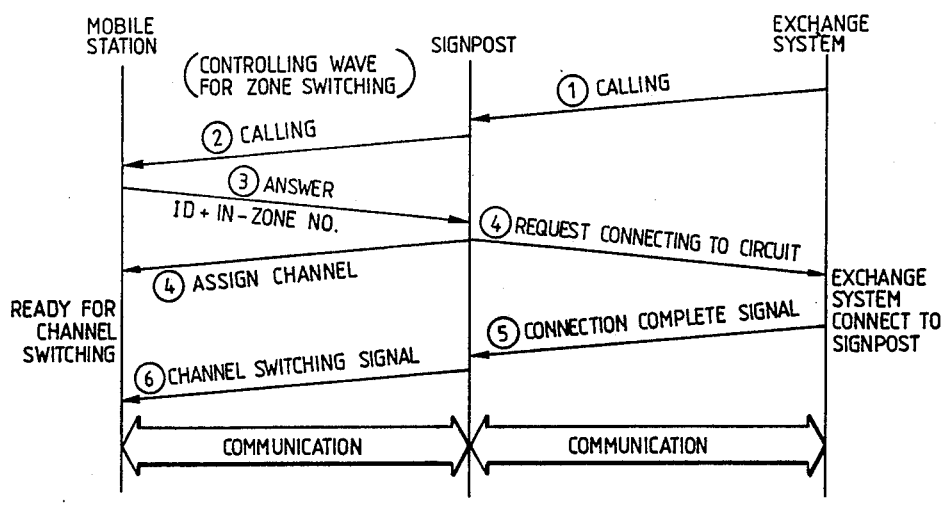
FIG. 8 is an explanatory diagram showing a procedure for call termination.
Figure 9:
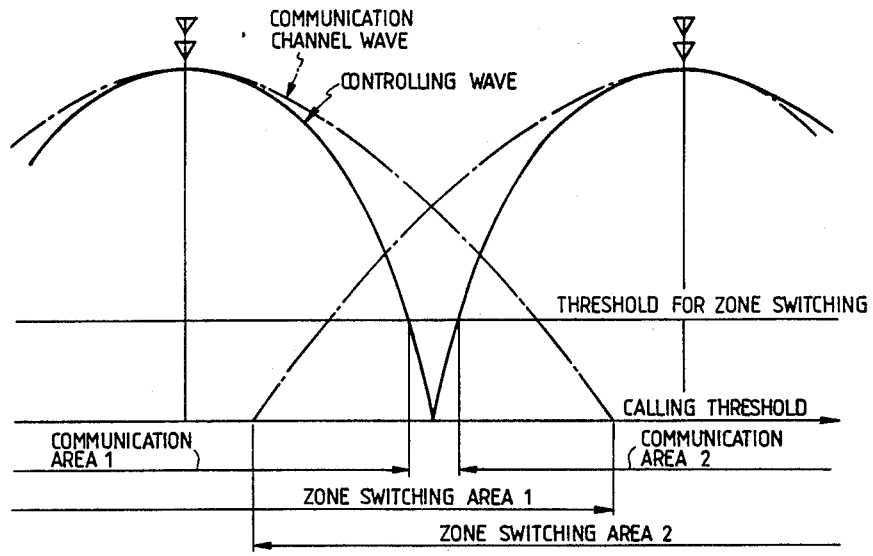
FIG. 9 is an explanatory diagram showing the relation between two high and low threshold values and a controlling radio wave.

FIG. 8 shows a procedure for call termination FIG. 9 is an explanatory diagram showing the relation between the controlling radio wave and the two high and low threshold values. The procedure for call termination will be described with reference to FIGS. 8 and 9.

The exchange system issues a calling request, and the signpost uses the zone switching antenna to transmit a paging signal to all mobile stations 1.

In response to the paging, each of the mobile stations 1 utilizes the controlling transceiver 12 to detect the controlling radio wave over a low threshold value, thus receiving the controlling radio wave continuously. That is, all of the mobile stations 1 in the communicating area receive the general calling.

Upon reception of the paging signal, the concerned mobile station 1 answers by using the up-link frc. In this operation, the ID of the mobile station is also transmitted (in addition, the in-zone number may be transmitted so that the answer to the paging is more succinct).

In response to the answer from the mobile station, the signpost uses the down-link ftc to specify the communicating channel assigned thereto, and requests the exchange system to connect the network.

The exchange system sends a network connection completion signal to the signpost, the signpost then instructs the mobile station 1 to switch the communicating channel over to that specified, and the mobile station enables communications by using the communicating channel specified.

Figure 10:
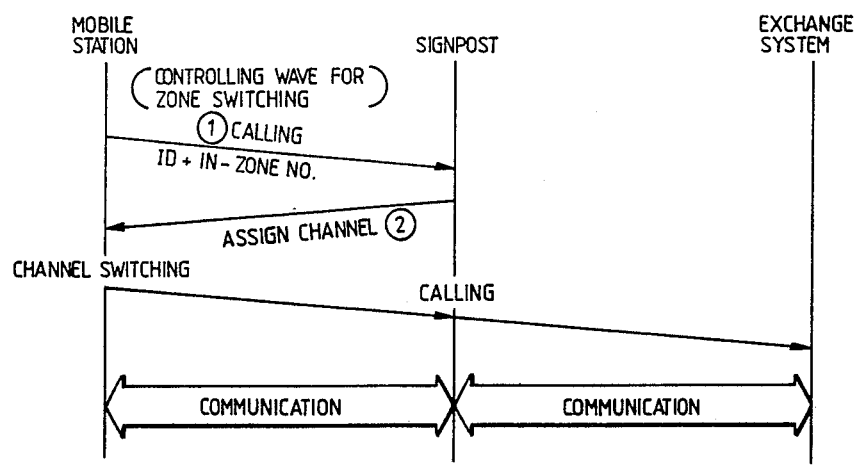
FIG. 10 is an explanatory diagram showing a procedure for call origination.

A procedure of a call terminating will be described with reference to FIG. 10. An originating call from the mobile station 1 is carried out by using the up-link frc. In this operation, the ID of the mobile station 1 is also transmitted (in addition to the ID, the in-zone number may be transmitted so that the calling will be more succinct).

In response to the call, the signpost uses the down-link ftc to specify the communicating channel assigned thereto. According to the instruction from the signpost, the mobile station 1 switches the communicating channel over to that specified for connection to the exchange system.

If in the signpost (just as in the mobile station), the signal reception threshold value of the zone switching antenna is low, then the signpost continuously receives the originating call from the mobile station 1.

Figure 12:
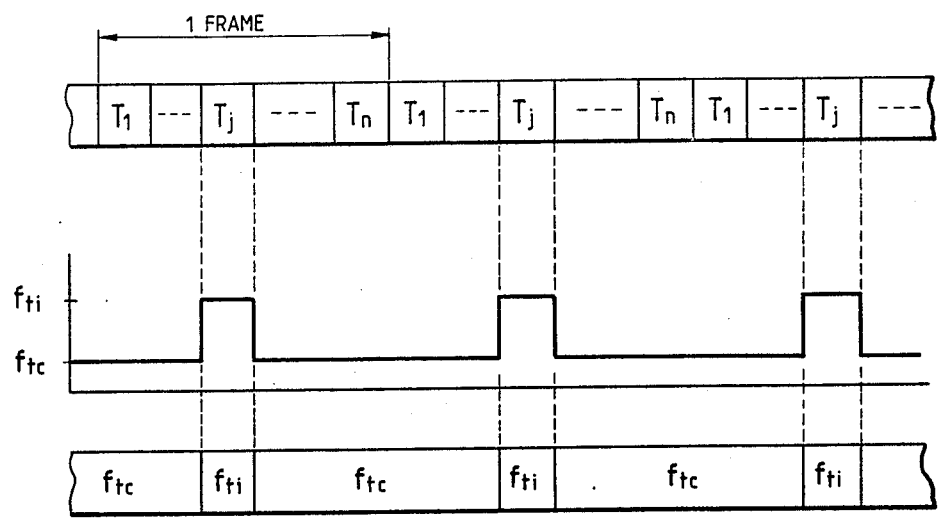
FIG. 12 is an explanatory diagram showing a frame format in the case of the TDMA communication system, for a description of a receiver at a mobile station.
Figure 11:
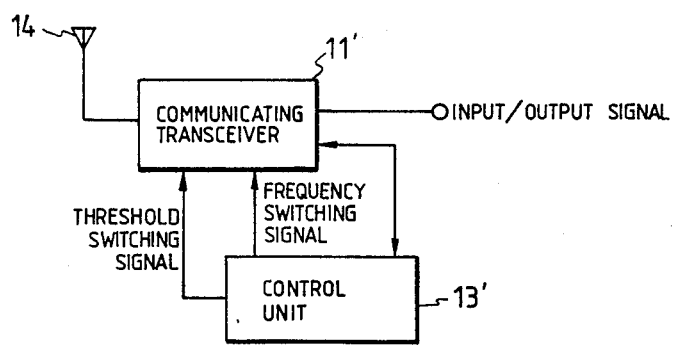
FIG. 11 is an block diagram showing another example of a mobile station.

FIG. 11 is a block diagram showing another example of the mobile station. The mobile station of FIG. 11 differs from the mobile station 1 shown in FIG. 6 in that the communicating transceiver 11 and the controlling transceiver 12 are formed into one unit 11'.

Where a TDMA communication system is employed, the frame format is as shown in FIG. 12. That is, signals are received by using the communicating frequencies fri and fti during the communicating time slow interval Tj assigned to the mobile station 1; however, it is unnecessary to do so during the period of time other than the communicating time slot interval Tj. A time slot therefore utilized to transmit and receive the zone switching control radio waves ftc and frc; the signal level for switching zones is detected, the in-zone number is recognized, and the operation of a call terminating or originating is controlled. Thus, the need for a controlling transceiver is eliminated.

Figure 13:
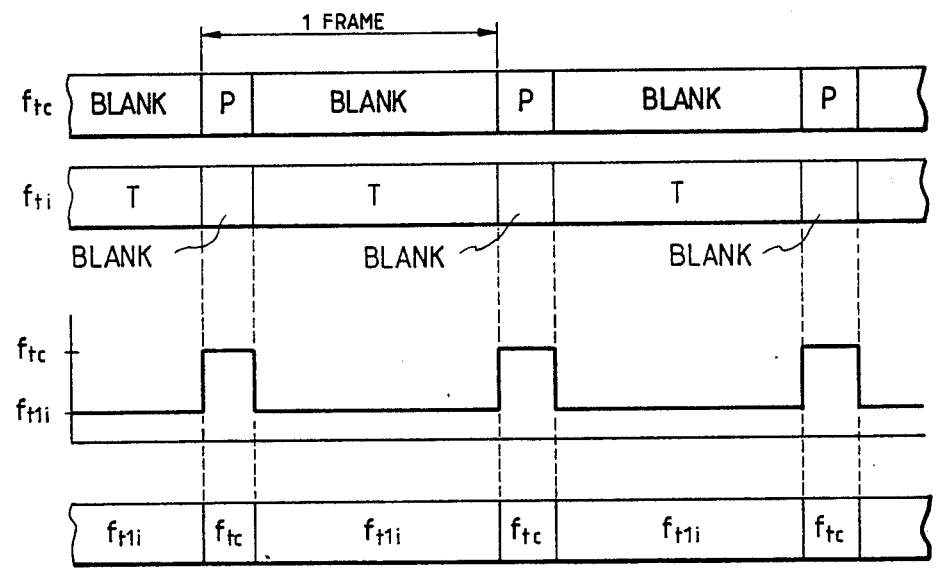
FIG. 13 is an explanatory diagram showing a frame arrangement in the case of the FDMA communication system, for a description of a receiver at a mobile station, wherein 1—Mobile station; bZ—Communicating region; cZ—Zone switching signal region; S—Signpost

On the other hand, where a FDMA communication system is employed, the frame format is as shown in FIG. 13. Blank intervals (Blank) are provided between frames in the communicating channel of the signpost, and in synchronization with the blank intervals, the zone switching signal is transmitted with the zone switching control channel ftc. In compliance with the frame format described above the mobile station receives the communicating channel ft1 and the zone switching control channel ftc alternately. Thus, (just as in the case of the TDMA communication system), the signal level for switching zones is detected, the in-zone number is recognized, and the operation of a call terminating or originating is controlled, without a controlling transceiver.

In a FDMA communication system, the controlling transceiver, may therefore be eliminated with the frame format remained unchanged. That is, the frequency of the transceiver of the mobile station 1 is switched over to the communicating frequency for signal transmission and reception, and it is regularly switched over to the zone switching control frequency, thereby eliminating the need for a controlling transceiver.

As was described above, each signpost has a dual zone arrangement comprising a communicating area overlapping the communicating areas of adjacent signposts, and a zone switching signal area which does not overlap those of the adjacent signposts. The mobile station in the zone switching signal region of a given signpost therefore receives the zone switching signal, so that it can detect the zone from its signal level in which it is located. The mobile station switches the communicating area of the preceding signpost over to that of the signpost in the zone thus detected, so that it can receive signals in the communicating area higher in signal strength. Thus, the switching of zones can be quickly achieved only by the signpost and the mobile station.

WHAT IS CLAIMED:

1. A mobile communication system including a plurality of signposts for relaying communications between a mobile station and an exchange system when said mobile station is within a predetermined area, said mobile communication system being suitable for inter-connection to a fixed communication network, said mobile communication system comprising:
    a plurality of signposts each of which has first and second transmission zones associated therewith, said first zone defining a communication area, the communication areas of adjacent signposts overlapping with each other, said second zone defining a zone switching signal area, the zone switching signal areas of said adjacent signposts not overlapping with each other;
    and a transceiver, said transceiver disposed in each of a plurality of mobile stations, said transceiver including means for indicating the presence of the mobile station within any particular one of said zone switching signal areas.

2. A mobile communication system as set forth in claim 1, wherein each signpost communicates with a mobile station in its first zone by using a frequency assigned only to said signpost; said signpost further including means for performing switching control with a mobile station in its second zone by using an assigned frequency common to all signposts.

3. A mobile communication system as set forth in claim 1 or 2, wherein
    said mobile station travels from a zone switching signal area of a first signpost into a zone switching signal area of an adjacent second signpost, whereupon said transceiver in said mobile station, while communicating with said first signpost, detects a new zone number from a zone switching control signal and queries said second signpost having said new zone number to establish a connection thereto, and assigns a new communicating channel to said mobile station thereby,
    said second signpost having said assigned zone number performs a communicating channel switching operation to assign a communicating channel to the mobile station, and an operation of connecting circuits to said exchange system, and
    wherein a zone switching operation is achieved while communication continues between the mobile station and said first signpost.

4. A mobile communication system as claimed in claims 1 or 2, wherein the transceiver of said mobile station includes at least two signal reception threshold values for receiving a controlling signal radio wave.

5. A mobile communication system as claimed in claims 1 or 2, wherein the transceiver of said mobile station transmits and receives a voice communication signal and a zone switching control signal, the transmitting and receiving frequencies of said transceiver switching alternately over from a communicating channel frequency to a zone switching control frequency at high speed.

6. A mobile communication system as set forth in claim 1, wherein said mobile station operates according to a TDMA communication system; and
    said mobile station switches the signal transmitting and receiving frequencies of the transceiver therein via communicating time slot intervals that are assigned to said mobile station and to zone switching controlling frequencies.

7. A mobile communication system as set forth in claim 1, wherein said mobile station operates according to an FDMA system wherein blanked intervals are provided between frames in a communicating channel of a signpost; and
    said mobile station switches frequencies of a transceiver thereof over to communicating frequencies at each frame of said communicating channel and to zone switching controlling frequencies at each blank interval.

8. A mobile communication system as set forth in claim 1, wherein said mobile station operates according to an FDMA communication system independently of the contents and the frame arrangement of a communicating channel, wherein predetermined frequencies of a transceiver are regularly switched over to a switching controlling frequency; and error correction and waveform estimation are carried out to suppress the deterioration of communication quality.

9. A mobile communication system including a plurality of signposts for relaying communications between a mobile station and an exchange system when said mobile station is within a predetermined area, said mobile communication system interconnected to an overall fixed network, said mobile communication system comprising:
    a plurality of signposts each having associated first and second transmission zones, said first zone being a communication area, and wherein the communication areas of adjacent signposts overlap with each other, said second zone being a zone switching signal area, wherein the zone switching signal areas of said adjacent signposts do not overlap with each other;

a transceiver disposed in each of a plurality of mobile stations, said transceiver indicating the presence of the mobile station within any particular one of said zone switching signal areas, said transceiver further including at least two signal reception threshold values for receiving a controlling signal radio wave, wherein said mobile station travels from a zone switching signal area of a first signpost into a zone switching signal area of an adjacent second signpost and said transceiver in said mobile station, while enabling communication with said first signpost, detects a new zone number from a zone switching control signal and queries said second signpost having said new zone number to establish a connection thereto, and assigns a new communicating channel to said mobile station thereby, said second signpost having said assigned new zone number performs a communicating channel switching operation and an operation of connecting circuits to said exchange system, and a zone switching operation is achieved while communication continues between the mobile station and said first signpost.

10. A mobile communication system as claimed in claim 9, wherein the transceiver of said mobile station is formed into one unit in which the signal transmitting and receiving frequencies thereof are switched alternately over to communicating channel frequencies and zone switching controlling frequencies at high speed.

* * * * *